Aug. 26, 1958 F. HENNIG 2,849,532

CIRCUIT ARRANGEMENT FOR THE TRANSMISSION OF TELEGRAPHIC INTELLIGENCE

Filed Oct. 22, 1953 3 Sheets-Sheet 1

Inventor.
Fritz Hennig.
By [signature] Atty.

Aug. 26, 1958 F. HENNIG 2,849,532

CIRCUIT ARRANGEMENT FOR THE TRANSMISSION OF TELEGRAPHIC INTELLIGENCE

Filed Oct. 22, 1953

3 Sheets-Sheet 2

Inventor:
Fritz Hennig.
By. [signature] Atty.

Aug. 26, 1958

F. HENNIG

CIRCUIT ARRANGEMENT FOR THE TRANSMISSION OF TELEGRAPHIC INTELLIGENCE 2,849,532

Filed Oct. 22, 1953

3 Sheets-Sheet 3

Inventor:
Fritz Hennig.
By [signature] Atty.

United States Patent Office 2,849,532
Patented Aug. 26, 1958

2,849,532

CIRCUIT ARRANGEMENT FOR THE TRANSMISSION OF TELEGRAPHIC INTELLIGENCE

Fritz Hennig, Munich-Solln, Germany, assignor to Siemens & Halske, Aktiengesellschaft, Munich, Germany, a corporation of Germany Application October 22, 1953, Serial No. 387,594

Claims priority, application Germany October 23, 1952

9 Claims. (Cl. 178—23)

The present invention relates to a circuit arrangement for the transmission of telegraphic intelligence or signals composed of similar code groups, such transmission being effected in accordance with a principle according to which, for the purpose of error detection and error elimination, a control signal is transmitted in addition to the code group representing the particular telegraph symbol or signal, this control signal being, in the case of an even number of current pulses of a certain type, for example, spacing current pulses, a duplication of the code group, and, in the case of an uneven number of current pulses of this particular type, a mirror reproduction of the code group. The term mirror reproduction implies that the polarity of the individual current pulses will be reversed as in a mirror so that a marking current pulse takes the place of a spacing current pulse and vice versa.

By comparing the code groups with the control signals at the receiver it is possible, in the case of single-disturbed signals (for example, where only one code element is disturbed), not only to detect which particular current pulse is disturbed but also to restore the original polarity of the disturbed pulse. If a current pulse is disturbed both in the code group and in the control signal it will of a certainty be detected as "disturbed." The same applies to the other double-disturbed signals. Signals that are disturbed more than twice are, on the other hand, only partially detected; threefold-disturbed signals are discoverable up to about 67%; quadruply disturbed signals are discoverable up to about 57%. Hence, only an extremely small portion of the disturbed signals can lead to the printing of a wrong character. The printing of signals detected as "disturbed" can either be prevented or they can be indicated in that a "blur" or error symbol is printed.

The invention is concerned with the problem of devising a transmitter arrangement by means of which it is possible to form, from the respective code group, the associated control signal in accordance with the aforementioned principle of operation, and to transmit both the code group and the control signal, and further, to devise a receiver arrangement which, by comparing the received code group of a signal with the control signal, detects the presence of disturbance in the corresponding group, retransmits undisturbed signals in their original form, for example, to a printing system, reconstructs single-disturbed signals by correcting the mutilated code element, and, in the case of multiple-disturbed signals, prevents the printing of a wrong character and causes the printing of a "blur" or error symbol.

According to the invention, it is proposed to provide means at the transmitter which scan, store and retransmit the code group, count one type of current pulses of the stored code group and, in the case of an even number of such current pulses, transmit the unchanged code group, and, in the case of an uneven number, the mirrored code group, or vice versa, as a control signal; it is further proposed that means be provided at the receiver whereby the received code group is scanned, stored and checked as to whether the number of one type of current pulses in this code group, preferably the spacing current pulses, is an even or uneven one, and whereby, in conjunction with means for scanning the control signals the functioning of other means is initiated which count the current pulses of the control signal, which, in the case of an even number of one type of current pulses in the said code group, have mirror polarity and, in the case of an uneven number of such current pulses, have the same polarity as the corresponding current pulses of the said code group, and whereby furthermore depending on such counting, additional means are brought into action which retransmit the undisturbed signals unchanged, and in the case of single-disturbed signals, effect the correction of the mutilated code element and the retransmission of the corrected signal, and, in the case of multiple-disturbed signals which are beyond reconstruction, initiate the operation of still further means which prevent the retransmission of the wrong signal and transmit in its place another signal to indicate that the former is "disturbed."

An example of the manner in which a send transmitter and receiver arrangement may be constructed in accordance with the invention will now be described with reference to the accompanying drawings Figs. 1 through 8. This embodiment is based on the 5-unit code customary with telegraph apparatuses (start-stop teleprinters).

Fig. 1 showing the scanning, storing and retransmitting circuit and also a chain circuit for establishing the even or uneven nature of the number of current pulses of like type, for example the spacing current pulses;

Figure 1:
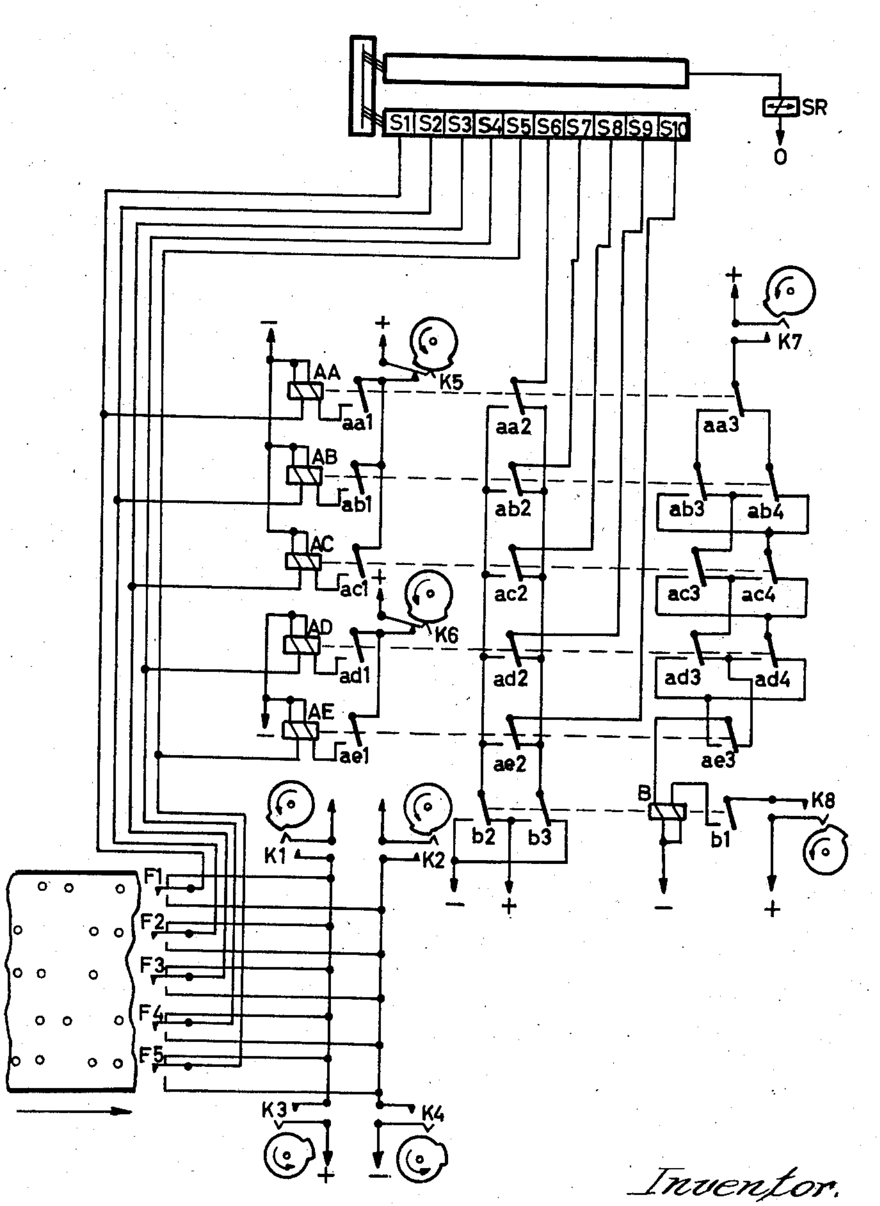
Fig. 1 represents parts of the transmitter and Figs. 2 and 3 parts of the receiver.

The scanning levers F1 to F5 in Fig. 1 serve for scanning the perforated tape shown at the left and containing the stored message that is to be transmitted. As the perforation of the tape is usually effected in such a manner that the tape is punched (hole) to indicate a spacing current pulse and not punched (no-hole) in order to indicate a marking current pulse, the scanning levers enter, when this type of tape is used, the hole in the case of spacing current pulses, so that they come to lie against the respectively cooperating contact connected with the positive pole of the voltage source, for example, the telegraph battery. In the case of marking current pulses the scanning levers remain in the position shown, that is, they lie at the respectively cooperating contact connected with the negative pole of the voltage source. During the scanning operation the cam controlled contacts K1 and K2, K3 and K4 are closed, so that the corresponding contacts of the scanning levers are connected to the current source. The position of the scanning levers and of the contacts is shown for the case where a signal is scanned which is composed solely of marking current pulses.

The distributor contacts S1 to S5 transmit the current conditions of the telegraph signal stored in the perforated tape, and scanned by the associated scanning levers, successively to the transmitter relay SR.

Simultaneous with this operation, the scanning levers connect to the relays AA to AE, each of which is associated with one of the scanning levers F1 to F5, the polarity of the voltage source as scanned by the scanning lever respectively associated therewith. As the relay windings are connected to negative potential, the relays will be energized only when positive potential is connected thereto, so that only when a spacing current pulse is scanned will energization be possible. The energization of the relays is maintained by their armatures *aa*1 to *ae*1 and their holding windings, whereby the scanned code group will remain stored in the relays AA through AE.

The scanning levers are for timing reliability subdivided into groups in generally known manner. The first group is made up of the scanning levers F1, F2 and F3; the second group of the scanning levers F4 and F5. Both groups are connected in succession, over their respectively associated cam contacts K1 and K2 and K3 and K4, to current disconnected from it. This measure serves, as is known, in cases where the perforated tape is to be fed during the rotation of the distributor, to prevent the relays AA to AE from being influenced by the scanning levers during this procedure. A falsification of the code group stored in the relays AA through AE is thus rendered impossible. The relays are also in known manner analagously subdivided into two groups AA, AB, AC and AD, AE.

In order to have the relays available in a deenergized condition for storing the next code group to be scanned at the end of the rotation of the distributor, they must be deenergized by the opening of their holding circuits. This is accomplished by successively opening the cam controlled contacts K5 and K6. The manner of group subdivision of the scanning levers and relays is given by way of example only and may be carried out differently as may be desired or require.

The chain circuit is formed by contacts controlled by the relays AA to AE. The positive pole of the current source is connected, by way of the cam controlled contact K7, to the break-make spring of transfer contact *aa*3; the negative pole of the current source is connected, by way of a winding of relay B, to the break-make spring of the transfer contact *ae*3. The transfer contacts *aa*3, *ab*3, *ab*4, etc., to *ae*3 are connected in series in such a manner that, if the scanned telegraph signal contains an uneven number of spacing current pulses, that is, an uneven number of relays AA through AE being energized, the positive pole of the current source will be switched through to the input of relay B, so that the latter will be energized and held energized over a second winding and its holding contact *b*1. In the case of an even number of spacing current pulses a similarly even number of relays AA through AE will be energized, and the chain circuit will not connect the positive pole of the current source through to the relay B, so that the latter will remain deenergized.

The closure of cam controlled contact K7 connects the chain circuit to the positive pole of the current source for a short period so as to extend the positive potential to relay B. During the rest of the time relay B will remain unaffected by the chain circuit. The holding circuit of relay B is interrupted by the brief opening of cam controlled contact K8, so that the relay will release and contact *b*1 will be opened.

The transfer contacts *aa*2 to *ae*2 of the relays AA through AE are with deenergized position of these relays in the normal positions shown. With any one of these relays energized, its associated transfer contact will be switched to the position opposite to the one shown. If the number of spacing current pulses in the code group is even, contacts *b*2 and *b*3 will lie in the position shown because in this case the relay B is not energized. The upper contact points of the transfer contacts *aa*2 to *ae*2 are accordingly connected to positive, and the corresponding right hand contact points to negative potential. The polarity of the voltage at the break-make contacts *aa*2 to *ae*2 corresponds in this case, therefore, to the polarity of the current pulses of the code group scanned by the scanning levers, so that, by way of the distributor contacts S6 through S10 which scan the stored group, the code group will be transmitted unchanged as a control signal to the transmitting relay SR. If, on the other hand, the number of spacing pulses in the code group is uneven, relay B will be energized. The contacts *b*2 and *b*3 will be switched to the position opposite to that shown, and the polarity of the voltage across contacts *aa*2 through *ae*2 will accordingly be reversed. The distributor contacts S6 through S10 now scan a code signal, which is a mirror reproduction of the stored code group, and pass the scanning results to the transmitting relay SR.

In the foregoing embodiment only the parts of the transmitter arrangement having a major bearing on the invention have been represented, namely, the electrical elements of the perforated tape scanning device, the storage and spacing-pulse counting device, and the facilities concerned in retransmitting the code groups and control signals. The other parts which are inherently essential for the practical operation of the arrangement, such as these necessary for the feeding of perforated tape, for the operation of the various contacts, etc., constitute components of teleprinter machines and, as they are already known in the most varied forms through their use in the many different types of teleprinter machines, have been omitted.

In order to achieve a high degree of error elimination, especially in the case of a prolonged disturbance, it will be advantageous to spread out the pulse train at the distributor, that is, to distribute the pulses of the code group and control signal over a complete revolution of the distributor. In the case of multiple equipment it is therefore advisable to subdivide the individual channels further. If additional registers are needed, the pulses of a signal may be spread over several rotations of the distributor. The equipment may actually be designed as desired, but the fact that it is to be used on lines susceptible to disturbance requires that it be designed for continuously synchronized operation. It may be operated in conjunction with tape transmitters or with converter units which permit the transition from start-stop to continuously synchronized operation in the known manner. The current pulses of the telegraph signals transmitted over the line L (Fig. 2) are received by the receiver relay $E_r$ in the scanning circuit represented in this figure. The armature contact *er* of the receiver relay will be switched according to the polarity of the incoming current pulses and connects the distributor contacts E1 to E10 to the positive pole of a current source, in the case of receiving spacing current pulses, and to the negative pole in the case of receiving marking current pulses. The distributor contacts E1 to E10 are actuated in succession and in synchronism with the transmitter contacts of the transmitter sending the corresponding message and scan the position of contact *er* of the receiver relay ER. Corresponding to the current conditions scanned by the distributor contacts the contacts *ra* to *rk* associated with the polarized distributor relays RA . . . RK will be placed into their spacing or marking positions. The distributor contacts E1 to E5 scan the code group that is, the characteristic train of current pulses assigned to each telegraph signal, and set their associated relays RA through RE. The control signal that follows will be scanned by the distributor contacts E6 to E10 and their associated relays RF through RK set accordingly.

The setting of the relays RA to RK is spread over the duration of one full rotation of the distributor, but both code groups must be available during a fixed period for joint evaluation. The settings of the relays RA to RK will therefore be stored for an adequate interval with the aid of the storage register circuit comprising relays YA to YE and TA to TE. The contacts *ra* to *rk* lie, when the relays RA through RK are set by the scanning of spacing current pulses, on the spacing side as shown; in the case of marking current pulses they will be placed into alternate positions.

The contacts *ra* to *re* are connected to positive potential by the cam controlled contacts V1 and V3 which, for reasons of timing reliability, are actuated in rapid succession. With the contacts *ra* to *re* on the spacing side, the positive potential will be extended to the corresponding nonpolarized relays TA to TE, and the latter are consequently energized. The holding contacts *ta*1 to *te*1 hold the relays in operated position. With the contacts *ra* to *re* on the marking side, however, the associated relays remain deenergized. The relays TA to TE now hold the received code group stored and, if no disturbance is present, the latter will agree with the original signal.

The nonpolarized relay YA is energized and is held over its holding contact *ya*1 if the contacts *ra* and *rf* are in the same position, that is, if the first current pulse of both the code group and the control signal is of the same type, whereas it will not be energized if the contacts *ra* and *rf* are in different positions, that is, if the polarity of the first current pulse of the code group is opposite to the polarity of the control signal. The same applies for the relays YB to YE.

In the case of undisturbed signals, the relays YA to YE will all be in the same condition of energization, namely, energized in the case of the code group being transmitted unchanged, that is, when it contains an even number of spacing pulses, and deenergized in the case of a mirrored reproduction of the code group being transmitted, that is, when it contains an uneven number of spacing pulses.

A brief opening of the cam controlled contacts V2 and V4 will open the holding circuits of the energized relays and restore them to their deenergized condition.

Figure 2:
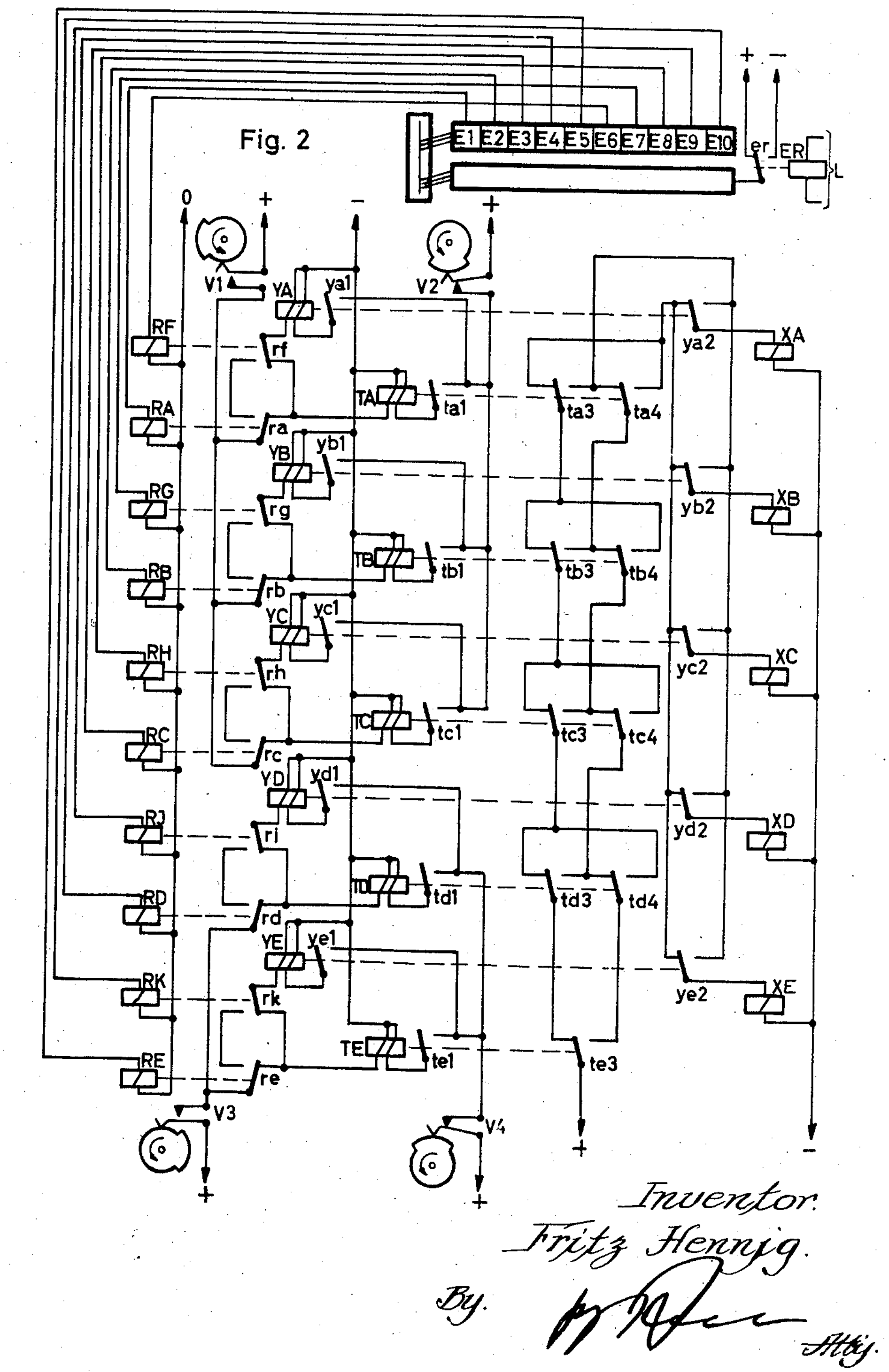
Fig. 2 shows the scanning and storing circuits of the receiver.

The counting circuit of Fig. 2 determines by means of the chain circuit including contacts *te*3, *td*3 and *td*4 to *ta*4 whether the number of spacing pulses of the code group received is even or uneven. If the number is even, the positive potential on contact *te*3 will be extended to the right hand contact points of contacts *ya*2 to *ye*2, and, if the number is uneven, to the corresponding left hand contacts. The contacts *ya*2 to *ye*2 lie, if the relays YA to YE are deenergized, on the side in which they are shown. The nonpolarized relay XA is accordingly energized if the number of spacing pulses is an even one and the relay YA is at rest, or if the number of spacing pulses is an uneven one and the relay YA is energized. The same applies for the relays XB through XE. The nonpolarized relays XA to XE will thus remain deenergized if no disturbance is present, since the above noted conditions for the energization of the relays XA to XE obtain only in the event a disturbance. Relays XA to XE accordingly operate in the nature of marker relays which ascertain and mark conditions of disturbance.

It a current pulse of the control signal is disturbed, the relay which corresponds to the disturbed pulse—one of the relays XA to XE—will be energized. If, on the other hand, a current pulse of the code group is disturbed, the relay that corresponds to the disturbed pulse—one of the relays XA to XE—will be at normal and the remaining four relays will be energized.

If two current pulses of a code group or its associated control signal are disturbed, then two or three of the relays XA to XE will be energized. If, for instance, the number of spacing pulses of the code group is even, and if two current pulses of the control signal are disturbed, an even number of the relays TA to TE will be energized, and two of the relays YA to YE corresponding to the disturbed pulses will be the deenergized. Accordingly, two of the contacts *ya*2 to *ye*2 will be in normal position as shown and will thus be connected to positive potenital as a result of the even number of spacing pulses of the code group, so that two of the relays XA to XE will be energized. For further cases of disturbance the number of relays—among the relays XA to XE—that are energized in any particular case, may easily be established by reference to Fig. 2 and to the foregoing explanations.

If one pulse of the code group and also one pulse of the control signal are disturbed, three relays among the relays XA to XE will be energized if the two disturbed pulses do not occupy the same position within the two groups, that is, the code group and the control signal. If, however, the two disturbed pulses occupy the same position in each group, for example, if the second pulse of the code group as well as of the control signal is disturbed, then all the relays XA to XE will be energized.

It will be apparent from the foregoing that undisturbed signals and signals having only one or two disturbed pulses or elements will of a certainty be detected. With signals having one disturbed pulse only, the disturbed pulse and the nature of the disturbance can be detected, while signals having two disturbed pulses can with certainty be distinguished from undisturbed signals or signals having only one disturbed pulse.

In the case of signals having three disturbed pulses, three or two of the relays XA to XE will be energized insofar as the disturbed pulses occupy different positions within the two groups. If, on the other hand, two of the three disturbed pulses occupy the same position in each group, that is, if the same current pulse is disturbed in both the code group and the control signal, and one of the remaining current pulses of the two groups is disturbed in addition, the setting of the relays XA to XE will be the same as in the case of a signal with one disturbed pulse. Accordingly, this type of disturbance will not be interpreted as a disturbance of three current pulses, but the signal is treated as having one disturbed pulse only and corrected wrongly with a wrong signal ensuing.

Signals having four disturbed pulses will only be interpreted as multiple-disturbed signals if, among the disturbed pulses, only one occupies the same position in both groups, that is, a current pulse of the code group and its corresponding current pulse in the control signal, and, additionally, any two other current pulses having unlike positions within the two groups. In all other cases these disturbances will not be recognized as multiple disturbances and the relays XA to XE will be set as in the case of undisturbed signals or signals having only one disturbed pulse, with the result that wrong signals ensue.

In accordance with the foregoing explanations a distinction must be made between the following cases for the purpose of further evaluation:

(*a*) The energization of none or one of the relays XA to XE signifies that the code group is not falsified by disturbances, and that the signal must be printed in agreement with the pulse train of the code group. Any disturbance which affects the associated control signal only will be disregarded, as it is of no consequence to the code group.

(*b*) If four of the relays XA to XE are energized, the respective code group must be corrected by reversing the polarity of the disturbed pulse.

(*c*) If two, three or five of the relays XA to XE are energized, this signifies that the signal is multiply disturbed, that it is beyond correction, and that the signal must be indicated as being disturbed.

Figure 3:
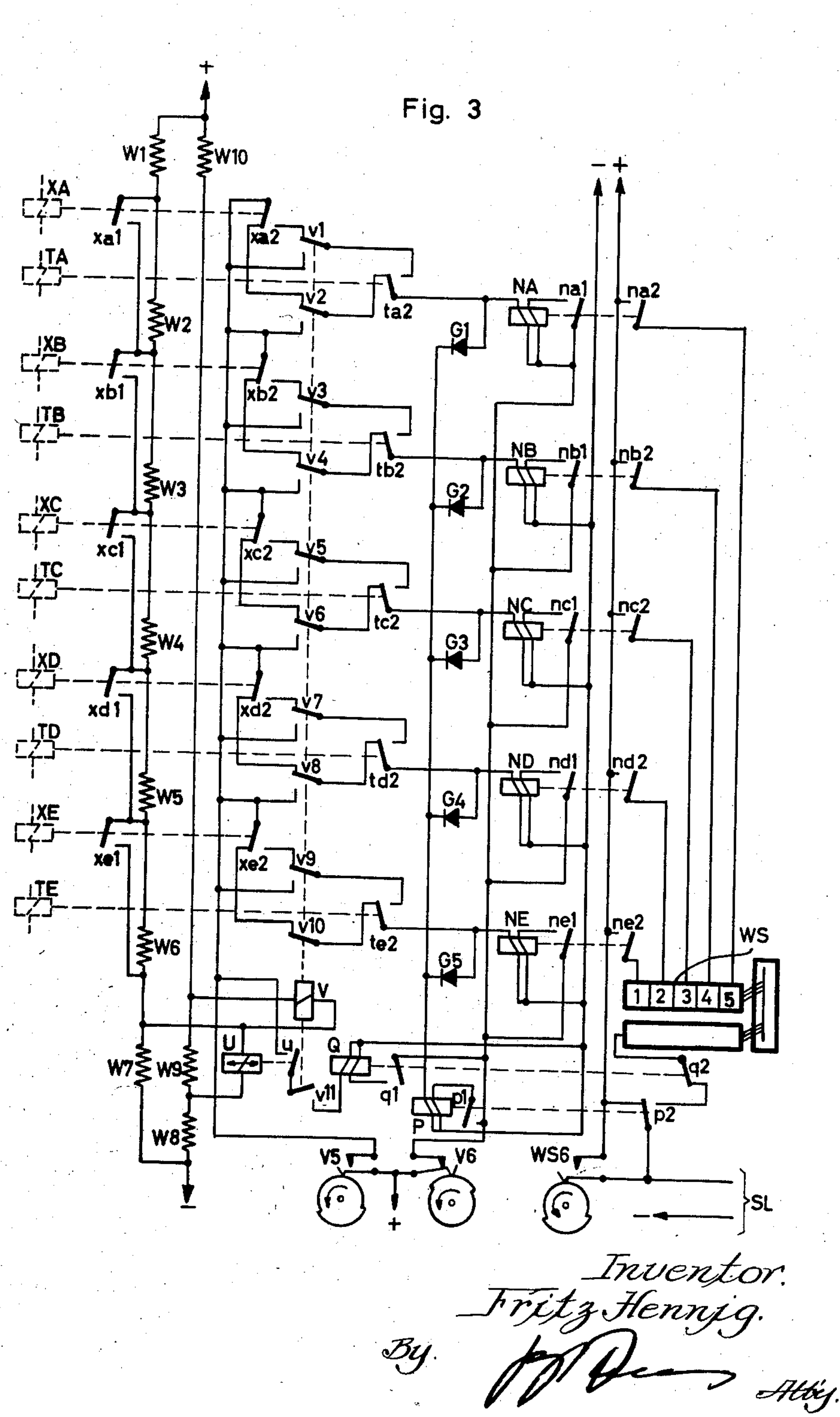
Fig. 3 shows circuit parts of the receiver, including a bridge circuit, a counting circuit, a correction circuit and a transmitter circuit.

A distinction is made between the above cases, *a*, *b* and *c* with the aid of the bridge circuit included in Fig. 3, comprising resistors W1 to W10 and containing two bridge arms, with the polarized relay U connected to one and the nonpolarized relay V connected to the other arm. The resistors W2 to W6 are connected with contacts *xa*1 to *xe*1 of relays XA through XE in such a manner that, if one of these relays is energized, the respective contact will shunt one of these resistors.

The bridge circuit, the mode of operation of which is generally known, is so arranged that relay V will not be energized if four of the relays XA to XE are energized, that is, if their contacts shunt out the corresponding resistors W2 to W6, but will be energized in all other cases.

The polarized relay U switches its contact *u* into the normal position shown in Fig. 3 if none or one of the relays XA to XE is energized, and actuated position opposite to that shown, if between two and five of the relays XA to XE are energized.

In the correction circuit represented in Fig. 3 signals received with one pulse disturbed are corrected, while in the case of signals recognized as being multiply disturbed the printing of a wrong signal will be prevented and the printing of a "blur" symbol initiated.

In case *a,* that is, when the code group is not disturbed, the contact *u* will lie in the position as shown. The relay V is energized, so that its contact *v*1 to *v*11 are switched to the position opposite to the one shown. The retransmit relays NA to NE will be set, depending on the condition of energization of the relays TA to TE, over the latter's transfer contacts *ta*2 to *te*2. If the relays TA to TE are energized, their corresponding contacts will lie in the positions opposite to those shown. The transfer contacts *xa*2 to *xe*2 exert no influence, being cut off by the contacts *v*1, *v*3, *v*5, *v*7 and *v*9. The retransmit relays NA to NE, which, if energized, are held over their holding contacts *na*1 to *ne*1, thereby store the code group.

In case *b,* that is, when one pulse of the code group is disturbed and requires correction, the transfer contact *u* lies in the position opposite to the one shown and, as relay V is not energized, its contacts lie in the position shown. The position of the contacts *ta*2 to *te*2 will correspond to the condition of energization of the relays TA to TE. The disturbed pulse will be corrected by one of the transfer contacts *xa*2 to *xe*2 being looped in over the contacts *v*1 to *v*10, since the disturbed pulse causes one of the relays XA to XE to display a condition of energization which is at variance with the others. The retransmit relays will in this case store the corrected code group.

In case *c,* that is, when several pulses of the code group are disturbed, the printing of a wrong signal must be prevented and indicated by the printing of a "blur" symbol. In this case, the contact *u* will lie in the position opposite to the one shown, and relay V will be energized. Over the series circuit of the contact *u* and of the contact *v*11, the disturbance-indicating relay Q will be energized and locked by its holding contact *q*1. The disturbance-indicating relay Q transmits, regardless of the setting of the relays NA to NE, causes transmission of a "blur" symbol, which may, for example, consist of code group 32 of the international telegraph alphabet. The receiving teleprinter must, of course, be adapted for printing a "blur" symbol upon receipt of the corresponding code group. To gain time for the retransmission, the positioning of the retransmit relays NA to NE will be effected simultaneously by the closure of the contacts *v*5 to *v*6. During non-typing periods, the code group 32 of the international telegraph alphabet, that is, five marking pulses, is transmitted over the continuously-synchronized path. Upon reception of this signal the contacts *ta*2 to *te*2 will lie on their currentless contact points. The standby-signal relay P remains deenergized. The relay P is connected in parallel with the retransmit relays NA to NE over the rectifiers G1 to G5. The rectifiers are necessary as otherwise the relays NA to NE would be interparalleled through the connection of the relay P. As soon as one of the relays NA to NE is energized, the relay P will also be energized and held over its holding contact *p*1.

If the retransmit relays NA to NE are energized, their contacts *na*2 to *ne*2 will be switched to the position opposite to the one shown, and will thus apply positive potential to their associated retransmit contacts WS1 to WS5. Through the successive closure of the retransmit contacts the signal stored in the relays NA to NE will be scanned and, over the relay contacts *q*2 and *p*2, transmitted to the transmission line SL leading, for instance, to a teleprinter subscriber. If the relay Q is energized, its contact *q*2 will disconnect the retransmit contacts WS1 to WS5 from the transmission line.

The retransmit contact WS6 transmits the stop element of usual length when the signal has been scanned by the retransmit contacts WS1 to WS5.

During non-typing periods the standby-signal relay P is released, and its contact *p*2 lies in the position shown to transmit continuous spacing current to the line SL.

The arrangement according to the invention may be operated in conjunction with other arrangements serving for the purpose of error elimination; it may, for instance, be advantageous, in the case of signals that are disturbed beyond correction, to initiate the operation of a check-back unit of the type generally known instead of printing a "blur" symbol. The relay Q which, initiated the printing of a "blur" symbol, would in this case have to actuate the check-back unit which, in turn, would cause the transmitting station to repeat the signal which had been detected as disturbed.

Changes may be made within the scope and spirit of the appended claims.

I claim:

1. In an error-correcting telegraph system having a transmitting station and a receiving station; means at said transmitting station for scanning a code combination containing one or the other of two possible types of signal elements, means for transmitting the signal elements of said scanned code combination to said receiving station, circuit means cooperating with said scanning means for storing the signal elements of the scanned code combination, means controlled by said storing means for ascertaining the respective odd or even number of signal elements of predetermined type contained in the stored code combination, means controlled by said ascertaining means for additionally transmitting to said receiving station a test combination allotted to said transmitted code combination, said test combination consisting in the case of an even number of signal elements contained in said code combination, of unaltered repetition of such signal elements and in the case of an odd number of signal elements in said code combination, of mirrored repetition of the signal elements of said code combination; means at said receiving station for scanning the signal elements of said code combination and of said test combination received from said transmitting station, first relay means controlled by said receiving scanning means for respectively storing said received signal elements of said code combination and of said test combination, circuit means cooperatively controlled by said first control relay means for ascertaining those signal elements of said received code combination which correspond in type to the sequentially corresponding signal elements of said test combination, means for ascertaining the odd or even number of the signal elements of predetermined type contained in said received code combination, circuit means for marking those signal elements of said received code combination which are, in the case of an even number of signal elements of predetermined type contained therein, of the opposite type as the sequentially corresponding signal elements of said received test combination and which are, in the case of an odd number of said signal elements of predetermined type contained therein, of the identical type as said sequentially corresponding signal elements of said received test combination, means controlled by said marking means for counting said marked signal elements of said received code combination, means for retransmitting the signal elements of said received code combination, second control relay means jointly controlled by said marking circuit means and by said counting means for governing the operation of said retransmitting means, and further circuit means cooperatively connected with said second control relay means for supressing retransmission of said signal elements of said code combination in the presence of a predetermined number of marked signal elements ascertained by said counting means and for causing transmission of an error signal in place of the suppressed signal elements.

2. A system and cooperation of parts according to claim 1, comprising relay means forming said storing means, a contact chain circuit controlled by said relay means for ascertaining the respective odd or even number of signal elements of predetermined type contained in the stored code combination, and circuit means governed by said contact chain circuit for effecting transmission of the signal elements of said test combination.

3. A system and cooperation of parts according to claim 1, comprising at said transmitting station mechanically movable tape means carrying said signal elements of said code combination to be transmitted, said tape means cooperating with the corresponding scanning means at said transmitting station.

4. A system and cooperation of parts according to claim 1, wherein said counting means comprises a bridge circuit including a plurality of interconnected resistors, a polarized and a non-polarized relay cooperatively connected with said bridge circuit, marking relays forming part of said circuit means for marking said signal elements, contact means controlled by said marking relays for respectively bridging one resistor for each signal element to be marked, and circuit means cooperatively controlled by said relays for governing the operation of said second control circuit means.

5. A system and cooperation of parts according to claim 4, comprising a correction circuit including circuit means controlled by said marking relays, first switching means controlled by said storing means at said receiving station, second switching means controlled by said non-polarized relay, further switching means controlled by said polarized relay, an error indicating relay, the energized condition of said polarized and said non-polarized relays governing operation of said correction circuit to correct disturbed signal elements and operation of said retransmitting means and also governing operation of said error indicating relay to suppress retransmission of said signal elements.

6. A system and cooperation of parts according to claim 5, comprising check-back means adapted to cause said transmitting station to repeat the transmission of a disturbed signal, and means controlled by said error indicating relay upon actuation thereof for connecting said check-back means.

7. A system and cooperation of parts according to claim 5, comprising control means for scanning and for retransmitting said signal elements under control of said retransmission means, said control means comprising switching means controlled by said retransmission means, means for scanning the switching condition of said switching elements, means for transmitting the result of such scanning, switching means for suppressing such transmitting and for transmitting instead a code combination signifying an error symbol, and switching means for transmitting after said scanning a stop signal.

8. A system and cooperation of parts according to claim 7, wherein the 32nd code combination of the international telegraph alphabet constitutes the code combination which signifies an error symbol.

9. A system and cooperation of parts according to claim 8, comprising a spacing signal relay for effecting transmission during printing intervals of current signifying spacing signals.

References Cited in the file of this patent

UNITED STATES PATENTS

| | | |
|---|---|---|
| 2,394,971 | Baugham | Feb. 19, 1946 |
| 2,512,038 | Potts | June 20, 1950 |
| 2,552,629 | Hamming et al. | May 15, 1951 |